United States Patent [19]

Mihulka

[11] 4,074,596

[45] Feb. 21, 1978

[54] WIRE STRIPPING APPARATUS

[75] Inventor: Merle C. Mihulka, Boyne City, Mich.

[73] Assignee: Essex Group, Inc., Fort Wayne, Ind.

[21] Appl. No.: 762,913

[22] Filed: Jan. 27, 1977

[51] Int. Cl.² ............................................... H02G 1/12
[52] U.S. Cl. .................................................... 81/9.51
[58] Field of Search .................. 81/9.5 R, 9.5 A, 9.51; 29/33 F

[56] References Cited

U.S. PATENT DOCUMENTS

| | | | |
|---|---|---|---|
| 3,541,896 | 11/1970 | Watson | 81/9.51 |
| 3,638,518 | 2/1972 | Parker | 81/9.51 |
| 3,838,612 | 10/1974 | Inami | 81/9.51 |
| 3,951,016 | 4/1976 | Gudmestad | 81/9.51 |

Primary Examiner—James L. Jones, Jr.
Assistant Examiner—Nicholas P. Godici
Attorney, Agent, or Firm—Lawrence E. Freiburger; Robert D. Sommer

[57] ABSTRACT

An apparatus for stripping insulation from wire. The wire stripping apparatus of the invention is capable of being used by itself or in conjunction with an automatic wire cutting machine. The apparatus includes a pair of pivotal power driven members which actuate a pair of reciprocating cutting heads. Near the end of an operating cycle, while the cutting heads are still closed, the entire power driven unit is moved axially away from the wire to strip the insulation from it by the same pivotal power driven members.

3 Claims, 5 Drawing Figures

WIRE STRIPPING APPARATUS

BACKGROUND OF THE INVENTION

In the prior art various types of machines for stripping insulation from wires have been developed. While they all have accomplished their goal, many have one significant drawback, that is, their complexity. Simple stripping machines have been developed. However, the simple stripping machines have generally mounted the cutting dies on pivotal members. For preciseness of operation, however, it is desirable to mount the cutting dies on reciprocating members rather than pivotal members.

U.S. Pat. No. 3,176,550 discloses a wire stripping machine in which the cutting dies are brought into engagement by pivotal members. Typical of the wire strippers having reciprocating cutting dies is the device shown in U.S. Pat. No. 3,530,746.

SUMMARY OF THE INVENTION

It is an object of the present invention to provide a simple, reliable and relatively maintenance free wire stripping machine. It is a further object of the invention to provide such a wire stripping apparatus which can be used in conjunction with or without a conventional wire cutting machine and conveyor.

These objects and others which will become apparent as the description of the invention proceeds are accomplished by the wire stripping apparatus of the invention. Briefly stated, the wire stripping apparatus of the invention includes a reciprocable power driven ram which coacts with a pair of driving members which are pivotally mounted on a pair of side plates at one end and adapted for cooperation with the ram at the other end. A pair of pivotal actuating members are pivotally mounted on the side plates at their center and are arranged to coact with the pivotal driving members at one end in such a manner that they are moved pivotally. The free end of each actuating member cooperates with a cutting head slidably mounted in a guide member attached to the side plates, to move a pair of cutting dies toward one another. The pivotal movement of the driving members is arrested by a stop member which is also attached to the side plate. The side plate is slidably attached to an outside side plate so that after movement of the driving members is arrested, continued movement of the ram results in axial movement of the side plates (and thus all components connected thereto) away from the wire being stripped so as to strip the insulation from the wire.

BRIEF DESCRIPTION OF THE DRAWINGS

In the course of the detailed description of the invention, reference will be made to the drawings in which.

DETAILED DESCRIPTION OF THE INVENTION

Figure 1:
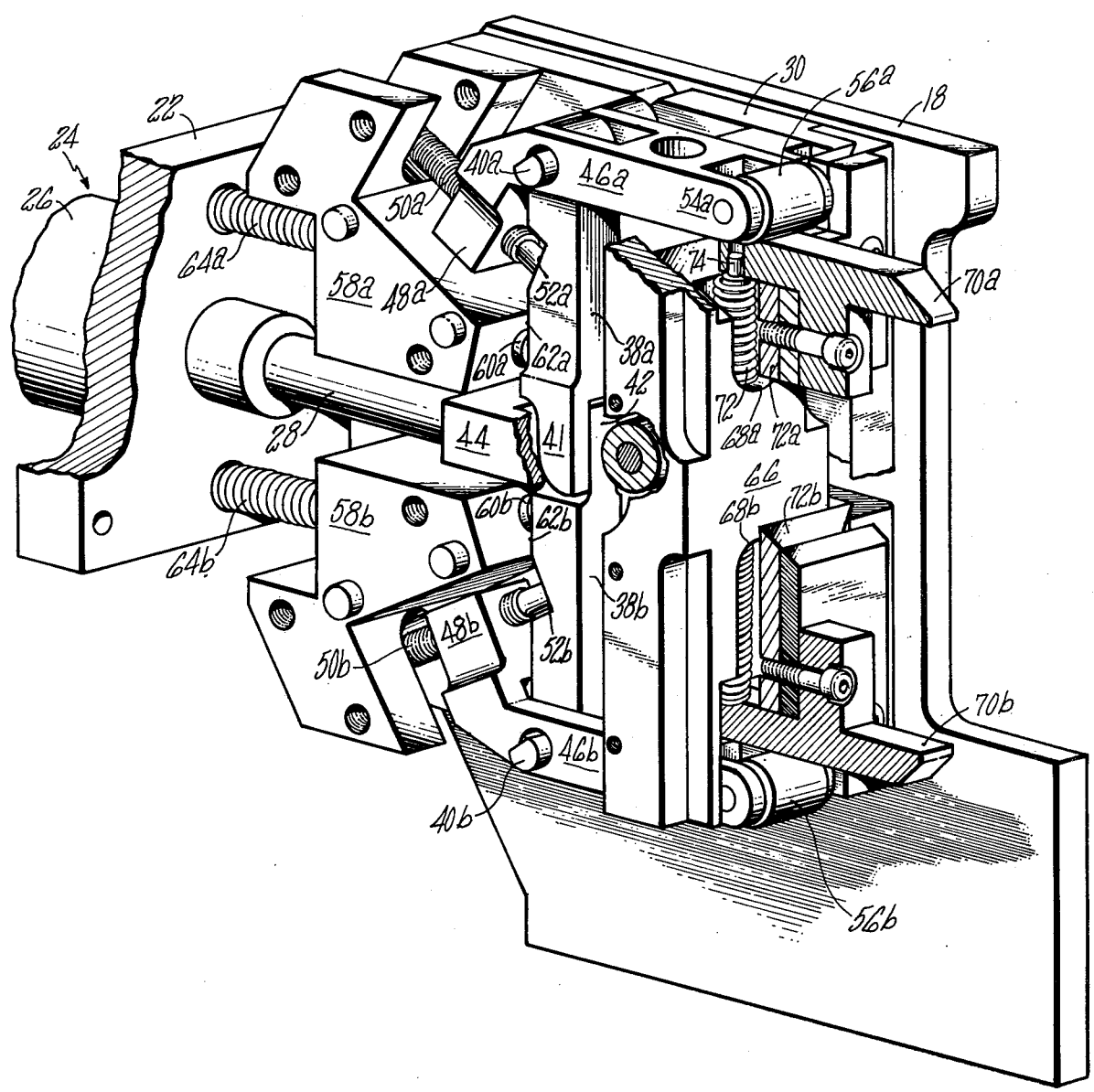
FIG. 1 is an isometric drawing, partly in section, of a wire stripping apparatus of the invention.

Referring now to the drawings, and particularly FIG. 1 which serves to illustrate the cooperation of the various components of the wire stripping apparatus of the invention, the apparatus of the invention is capable of being used in conjunction with a conventional wire cutting device and conveyor in the same manner as prior art wire stripping devices. For a more detailed discussion of the cooperation of the wire stripping device with the wire cutting device and conveyor, reference may be had to U.S. Pat. No. 3,530,746 for such a discussion.

Figure 5:
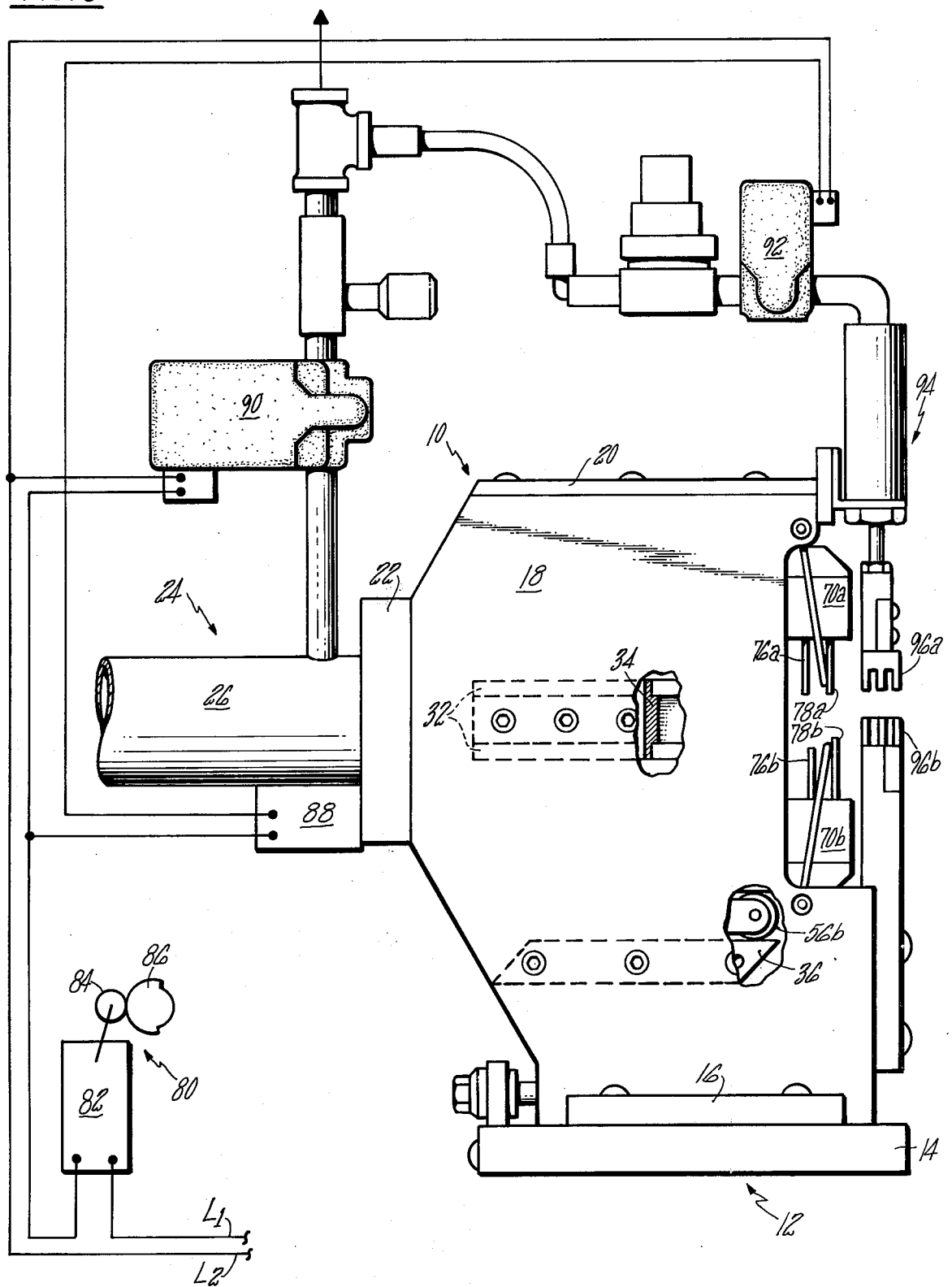
FIG. 5 is an elevational view of the wire stripping apparatus of the invention and the control system therefor.

The wire stripping device of the invention generally indicated by reference numeral 10 is preferably mounted on a base assembly 12 including base plate 14 and side rails 16. A housing for the device is formed by two identical upstanding outside side plates 18 which are attached to the base assembly 12 and a cover plate 20 suitably attached to the side plates 16. Only one outer side plate is shown in FIG. 5 because it is an elevation view and in FIG. 1 because the other side plate has been removed in order to more clearly show the operating components of the device. A back plate 22 is attached between the side plates 20.

The wire stripping device of the invention is powered by a pneumatic ram assembly 24 including a cylinder 26 fixed to the back plate 22 and a piston rod 28 driven by a piston internally located within the cylinder 26. A pair of inner side plates 30 are slidably mounted with respect to the outer side plates 18 so that the inner plates and components attached thereto are movable toward and away from wire being stripped of insulation. It will be seen that a track member 32 formed in the outside of the inside side plates 30 cooperates with a corresponding rail member 34 attached to the inside surface of the outer side side plates 18 to allow the two to be moved relative to one another. Suitable lubrication means is provided to lubricate the interface between track 32 and rail 34. A bottom rail member 36 is mounted between the outside side plates 18 and aids in maintaining the spacing between them as well as guiding a roller bearing 56b and inner side plates 30 during movement thereof as will hereinafter be described.

A pair of driving members 38a and 38b are mounted for pivotal movement on pivot pins 40a and 40b respectively which are suitably mounted between side plates 30. The free end of pivotal driving member 38a includes a pair of fingers 41 which extend into a ring-like member 44 attached to piston rod 28 and the free end of driving member 38b includes a finger 42 meshing with fingers 41 and extending into the ring-like member 44.

A pair of pivotal actuating members 46a, 46b are mounted along with the driving members 38a, 38b on pivot pins 40a and 40b respectively. The pivotal actuating members 46a, 46b are pivoted near their center and include a driven portion 48a, 48b which is driven by the cooperation of a screw member 50a, 50b threaded therethrough which abuts against an abutment notch 52a, 52b formed in the driving members 38a, 38b. The second end 54a, 54b of the actuating members 46a, 46b has a roller bearing 56a, 56b mounted thereon, the purpose of which will hereinafter be described.

A pair of stop members 58a, 58b are secured to the inner side plates 30 by suitable means. The stop members 58a, 58b include an abutment surface 60a, 60b thereon which cooperates with a corresponding abutment surface 62a, 62b on the driving members 38a, 38b to arrest their pivotal movement at a desired point in the operating cycle. A pair of compression spring members 64a, 64b mounted between the back plate 22 and the stop members 58a, 58b serve to bias the inner side plates 30 and all components connected thereto forward relative to the outer side plates 18.

A cutting head guide member 66 is also suitably mounted between the inner side plates 30. The guide member 66 has upper and lower guide slots 68a, 68b which cooperate with upper and lower guide plates 72a, 72b mounted upon upper and lower cutting heads 70a, 70b to mount the cutting heads for slidable reciprocal movement toward and away from one another. The cutting heads 70a, 70b are further guided in their slidable reciprocal movement by pin shaped guide member 74 which extends through a bore (not shown) in guide member 66 connecting guide slots 68a and 68b. A compression spring member 72 surrounds the pin member 74 and serves to bias the two cutting heads 70a and 70b apart. Two pairs of cutting blades, the inner pair being denoted by reference numerals 76a, 76b and the outer pair being denoted by reference numerals 78a, 78b are mounted on the reciprocal cutting heads 70a, 70b. The arrangement of the cutting blades is well known in the art; therefore, it should suffice to say that the inner pair of cutting blades serves to completely sever the wire and insulation while the outer pair of cutting blades serves to cut only deep enough to sever the insulation only so as to trim the end of the wire and strip a predetermined length of insulation therefrom.

OPERATION OF THE WIRE CUTTING MECHANISM

Figure 2:
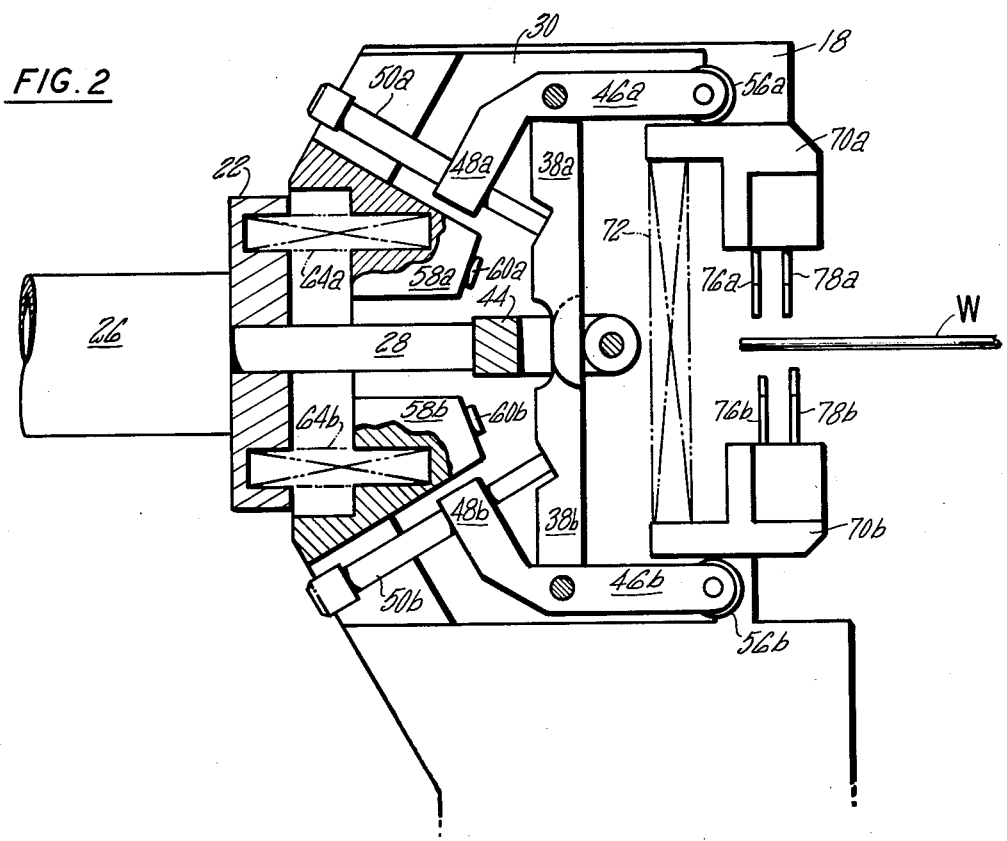
FIGS. 2, 3 and 4 are schematic diagrams depicting the operation of the wire stripping apparatus of the invention.
Figure 3:
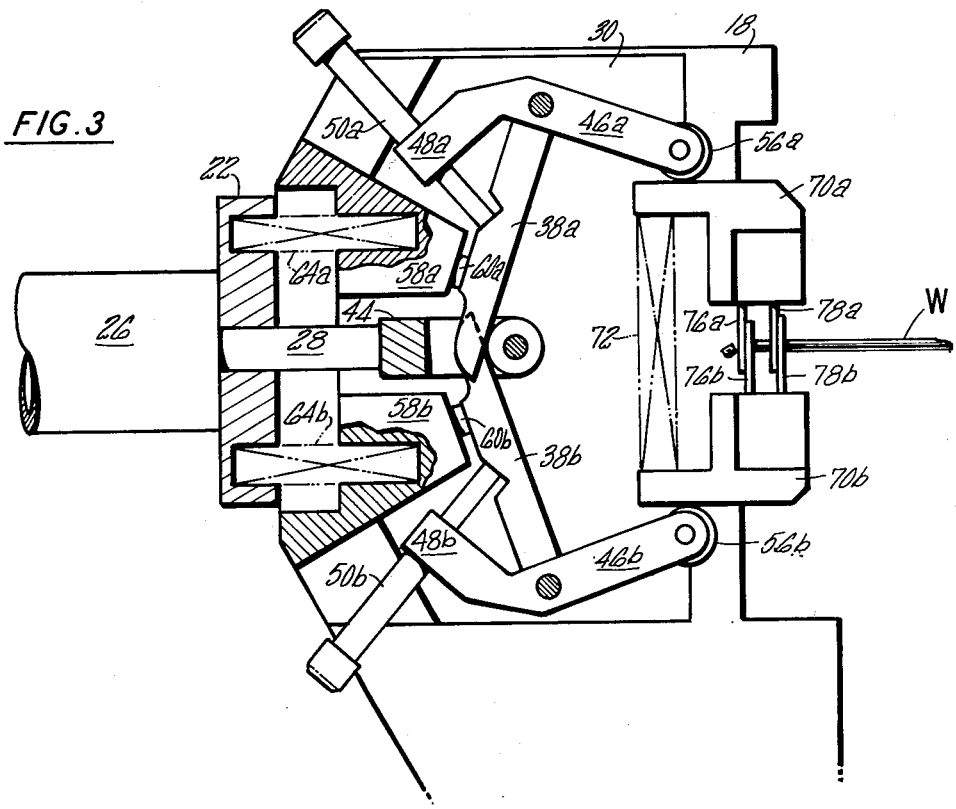

In order to more fully describe the operation of the wire cutting device of the invention, reference will be made to FIGS. 2, 3 and 4 which depict the device in its various stages of operation. In FIG. 2, the device is in its deactivated state with cutting heads 70a, 70b being located in their retracted position and a wire W in position to be cut and stripped. In FIG. 3 the piston rod 28 has been retracted to the left so as to pivot driving member 38a, 38b in a clockwise and counterclockwise direction, respectively. As the driving members 38a, 38b are rotated, the actuating members 46a, 46b are rotated also, so that the roller bearings 56a, 56b are moved toward one another. As the roller bearings 56a, 56b move towad one another, they urge the upper and lower cutting heads 70a, 70b inwardly toward one another against the bias of spring member 72. In the position shown in FIG. 3, pivotal movement of driving members 38a, 38b has been arrested by abutments 60a, 60b so that the cutting heads 70a, 70b have been moved inwardly toward one another to the maximum extent. Thus in FIG. 3, the end of wire W has been severed by inner cutting blades 76a, 76b and the wire insulation has been completely cut through by blades 78a, 78b.

Figure 4:
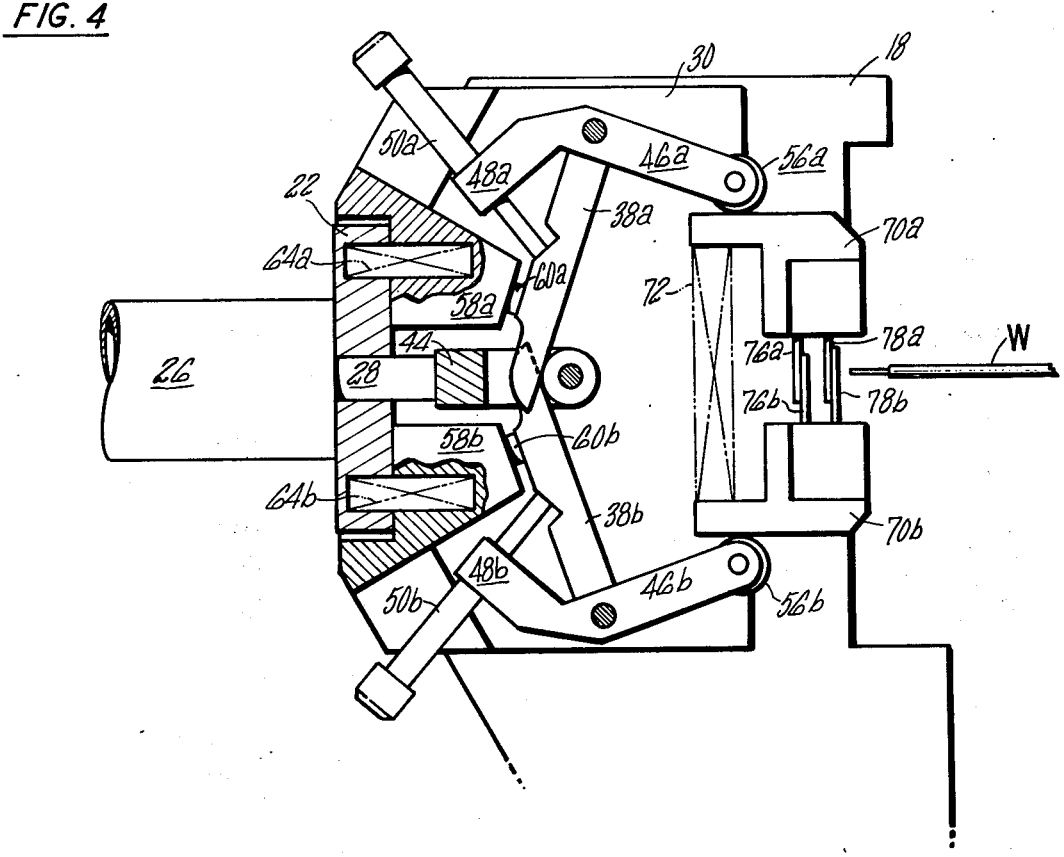

In FIG. 4 the piston rod 28 has continued its movement to the left. However, since pivotal movement of driving members has been arrested, continued movement of the piston rod 28 tends to move stop members 58a, 58b rearwardly and thus inner side plates 30 and all components attached thereto, to the left as viewed in FIG. 4, against the bias of springs 64a, 64b until such movement is prevented by back plate 22. Thus, it will be seen as viewed in FIG. 4, that cutting blades 76a, 76b, are moved to the left while still closed to strip the cut segment of insulation from the wire W. The stripped wire is then removed and the sequence repeated with another wire.

DESCRIPTION OF THE CONTROL SYSTEM FOR THE WIRE STRIPPING APPARATUS OF THE INVENTION

Reference will now be made to FIG. 5 where the components of the control system for operating the wire stripping apparatus of the invention are illustrated. The control system and wire stripping device as illustrated in FIG. 5 are adapted to be used in conjunction with an automatic wire cutting device in which the wires cut to a predetermined length are fed to the wire stripper by a conveyer mechanism from the cut-off device.

The control system includes power lines L1 and L2 which are connectable to a suitable power source. Power to the system is controlled by a master timing switch 80 which may be comprised of a microswitch 82, having an actuator member 84 driven by timing cam 86. The timing cam 86 is mounted for rotatable movement by the mechanism which feeds the cut wires to the stripping device of the invention. The other electrical components of the control system include a normally closed switch 88 operated by the piston is cylinder 26, a solenoid valve 90 controlling operation of the pneumatic ram assembly 24 and solenoid valve 92 controlling operation of a second pneumatic ram assembly 94. The purpose of the second pneumatic ram assembly 94 is to actuate an upper reciprocable wire holding jaw 96a which cooperates with a fixed lower wire holding jaw 96b to clamp a wire in place during the stripping operation.

In operation of the control system depicted in FIG. 5, the cam 86 is designed so that the wire stripping device is cycled through a portion of its operating cycle while the conveyer has been momentarily stopped to allow the stripping operation to be performed on a wire brought to the stripper by the conveyor. It will be seen that at the beginning of an operating cycle, when master timing switch 82 is closed by cam 86, and due to the fact that switch 88 is closed, solenoid valves 90 and 92 will both be opened to initiate operation of ram assemblies 24 and 94. Thus, jaws 96a, 96b will close to grip a wire which has been brought to the stripping station and cutting heads 70a, 70b will begin to move toward one another. The stripping device 10 is then cycled as depicted in FIGS. 2–4. When the stripping device 10 has reached the point in its operating cycle depicted in FIG. 4, switch 88 is opened, thus closing solenoid valve 92 to allow jaws 96a, 96b to open and release the wire held therebetween. The conveyor then moves the stripped wire away from the stripping station and cam 86 shortly thereafter opens master timing switch 82 to deactuate solenoid valve 90 so as to allow the components of the stripping device to return to their normal position indicated in FIG. 2.

An exemplary embodiment of the invention has been set forth in this specification. Modifications and alterations will occur to those skilled in the art. Accordingly, it is intended that the scope of the invention be defined in the claims.

What is claimed is:

1. A device for stripping insulation from the end of an insulated wire, comprising:
   a housing assembly;
   an inner housing slidably mounted for reciprocable movement with respect to said housing assembly, said inner housing being movable between actuated and retracted positions;

a pair of cutting blades;

means for slidably mounting said cutting blades for reciprocable movement on said inner housing;

ram means for providing a linear movement between actuated and deactuated positions;

motion conversion means for converting the linear movement of said ram means into linear movement of said cutting blades in a direction radial to the axis defined by the linear movement of said ram means;

stop means for arresting movement of said motion conversion means at a predetermined point in the operating cycle of said device; and said ram means and said stop means being effective to initiate movement of said inner housing toward the retracted position after said movement of said motion conversion means has been arrested.

2. The wire stripping device as claimed in claim 1, wherein said motion conversion means comprises:

top and bottom elongated driving members, each driving member being pivotally mounted at one end and having its other end extending radially toward the axis formed by the linear movement of said ram means;

connection means between said ram means and said other end of said driving members;

top and bottom actuating members, each said actuating member being pivotally mounted intermediate its first and second ends on said inner housing at the same point as said top and bottom driving members, respectively; and second connection means between said driving members and said actuating members for pivoting said actuating member when said driving member is pivoted.

3. A device for stripping insulation from the end of an insulated wire, comprising:

a housing assembly;

an inner housing slidably mounted for reciprocable movement with respect to said housing assembly, said inner housing being movable between actuated and retracted positions;

a pair of cutting blades;

means for slidably mounting at least one of said cutting blades for reciprocable movement on said inner housing;

a pivot pin on said inner housing;

an elongated driving member pivotally mounted on said pivot pin;

an actuating member pivotally mounted on said pivot pin intermediate first and second ends;

first connection means between said driving member and said first end for pivoting said actuating member whenever said driving member is pivoted;

means on said second end for operating said cutting blades whenever said actuating member is pivotally moved;

first stop means on said inner housing for arresting the pivotal movement of said driving member;

ram means for providing a linear reciprocable actuating movement between actuated and retracted positions;

second connection means between said ram and said driving member; and said ram means and said second connection means being effective to initiate slidable movement of said inner housing toward the retracted position after pivotal movement of driving member has been arrested.

* * * * *